(12) United States Patent
Wing

(10) Patent No.: US 7,496,044 B1
(45) Date of Patent: Feb. 24, 2009

(54) METHOD AND APPARATUS FOR ANALYZING A MEDIA PATH FOR AN INTERNET PROTOCOL (IP) MEDIA SESSION

(75) Inventor: Daniel G. Wing, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 929 days.

(21) Appl. No.: 10/797,689

(22) Filed: Mar. 9, 2004

Related U.S. Application Data

(63) Continuation of application No. 10/723,118, filed on Nov. 26, 2003.

(51) Int. Cl.
*H04L 12/26* (2006.01)
(52) U.S. Cl. ............................ 370/242; 370/255
(58) Field of Classification Search ............... 370/242, 370/255
See application file for complete search history.

(56) References Cited

U.S. PATENT DOCUMENTS

| | | | |
|---|---|---|---|
| 5,563,875 A | 10/1996 | Hefel et al. | |
| 5,675,741 A | 10/1997 | Aggarwal et al. | |
| 6,023,455 A | 2/2000 | Takahashi | |
| 6,104,695 A | 8/2000 | Wesley et al. | |
| 6,275,471 B1 | 8/2001 | Bushmitch et al. | |
| 6,337,861 B1 | 1/2002 | Rosen | |
| 6,515,967 B1 | 2/2003 | Wei et al. | |
| 6,526,044 B1* | 2/2003 | Cookmeyer et al. | 370/352 |
| 6,614,781 B1 | 9/2003 | Elliott et al. | |
| 6,687,225 B1 | 2/2004 | Kawari et al. | |
| 6,700,874 B1 | 3/2004 | Takihiro et al. | |
| 6,731,609 B1 | 5/2004 | Hirni et al. | |
| 6,741,600 B1 | 5/2004 | Weiss et al. | |
| 6,775,703 B1 | 8/2004 | Burns et al. | |
| 6,337,739 B1 | 9/2004 | Lee | |
| 6,804,244 B1 | 10/2004 | Anandakumar et al. | |
| 6,944,132 B1 | 9/2005 | Aono et al. | |
| 6,947,381 B2 | 9/2005 | Wen et al. | |
| 7,068,607 B2 | 6/2006 | Paratain et al. | |
| 7,072,968 B2 | 7/2006 | Mikami et al. | |
| 7,286,467 B1 | 10/2007 | Sylvain | |
| 7,310,334 B1 | 12/2007 | FitzGerald et al. | |
| 7,336,620 B2 | 2/2008 | Bennett | |
| 2002/0083186 A1 | 6/2002 | Stringer | |
| 2003/0053419 A1 | 3/2003 | Kanazawa et al. | |
| 2003/0072269 A1 | 4/2003 | Teruhi et al. | |
| 2003/0097438 A1* | 5/2003 | Bearden et al. | 709/224 |
| 2003/0163772 A1 | 8/2003 | Jaworski | |
| 2003/0165114 A1 | 9/2003 | Kusama et al. | |
| 2003/0208616 A1* | 11/2003 | Laing et al. | 709/236 |

(Continued)

OTHER PUBLICATIONS

Information Sciences Institute, University of Southern California, "Internet Protocol Darpa Internet Program Protocol Specification", Sep. 1981, pp. 1-49.

(Continued)

*Primary Examiner*—Brian D Nguyen
(74) *Attorney, Agent, or Firm*—Stolowitz Ford Cowger LLP

(57) ABSTRACT

Time To Live (TTL) values are modified in media packets to intentionally cause rejection of the media packets at intermediate nodes in a media path. Rejection notices caused by the TTL modified media packets are then analyzed to isolate Quality of Service (QoS) problems in the media path.

24 Claims, 12 Drawing Sheets

U.S. PATENT DOCUMENTS

| | | |
|---|---|---|
| 2003/0220971 A1 | 11/2003 | Kressin |
| 2004/0008715 A1* | 1/2004 | Barrack et al. .............. 370/429 |
| 2004/0125965 A1* | 7/2004 | Alberth et al. ................ 381/77 |
| 2004/0170163 A1* | 9/2004 | Yik et al. .................... 370/389 |
| 2004/0193709 A1* | 9/2004 | Selvaggi et al. ............ 709/224 |
| 2004/0218617 A1 | 11/2004 | Sagfors |
| 2004/0223458 A1 | 11/2004 | Gentle |
| 2004/0240431 A1 | 12/2004 | Makowski et al. |
| 2004/0252646 A1 | 12/2004 | Adhikari et al. |
| 2006/0098586 A1 | 5/2006 | Farrell et al. |
| 2007/0153774 A1 | 7/2007 | Shay et al. |
| 2007/0212065 A1 | 9/2007 | Shin et al. |
| 2007/0286165 A1 | 12/2007 | Chu et al. |

OTHER PUBLICATIONS

Information Sciences Institute, University of Southern California, "Transmission Control Protocol Darpa Internet Program Protocol Specification", Sep. 1981, pp. 1-88.

Information Sciences Institute, University of Southern California, R. Braden, Internet Engineering Task Force, "Requirements for Internet Hosts—Communication Layers", Oct. 1989, pp. 1-115.

H. Schulzrinne et al., RTP: A Transport Protocol for Real-Time Applications, RFC3550, Network Working Group, Jul. 2003, 98 pages.

* cited by examiner

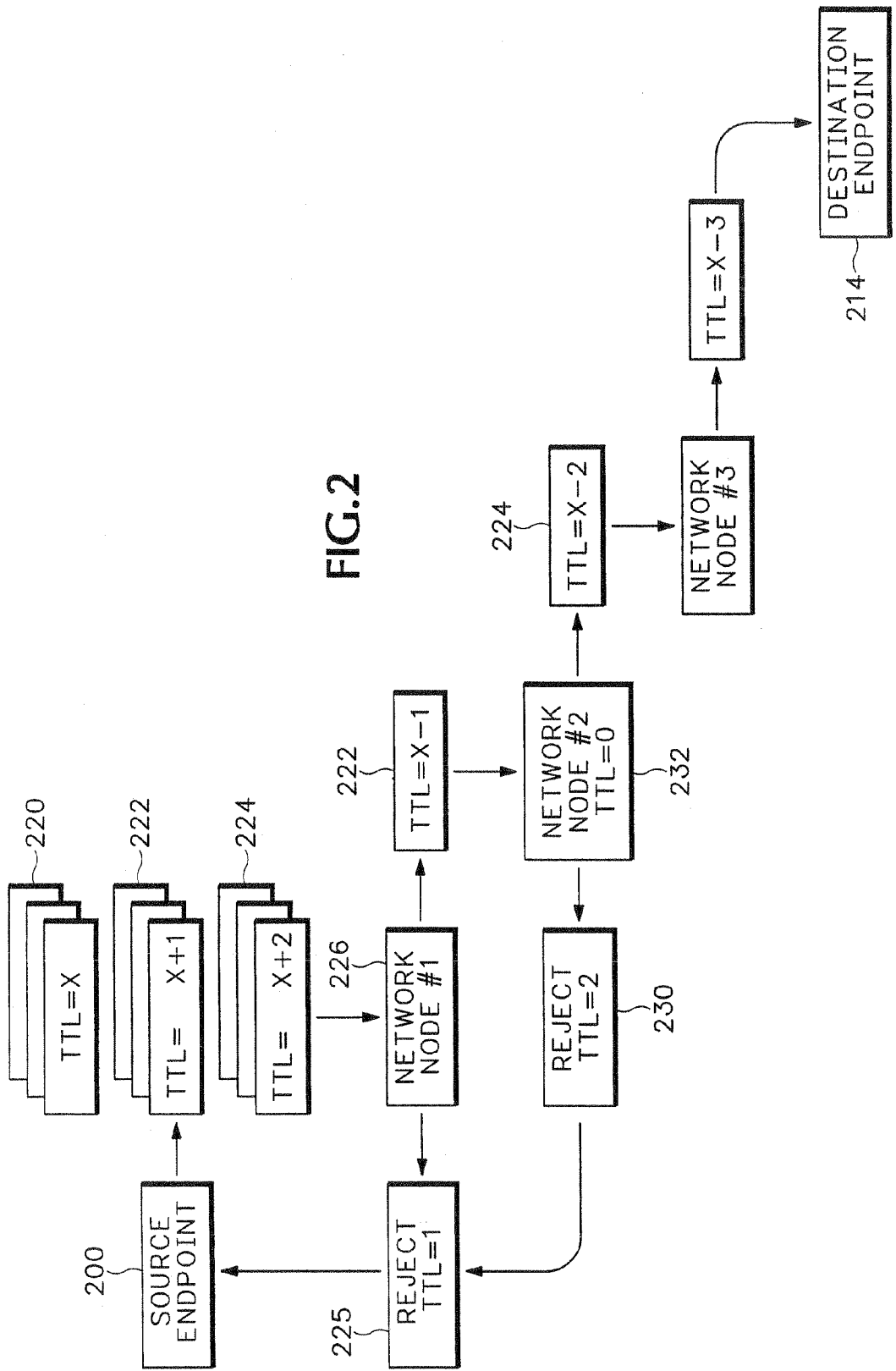

METHOD AND APPARATUS FOR ANALYZING A MEDIA PATH FOR AN INTERNET PROTOCOL (IP) MEDIA SESSION

This invention is a continuation in part of U.S. patent application Ser. No. 10/723,118, filed Nov. 26, 2003, entitled: Method and Apparatus For Analyzing a Media Path in a Packet Switched Network.

BACKGROUND

No tools exist today which can reliably measure the contribution to jitter and delay caused by the intermediate router hops between two endpoints in an Internet Protocol (IP) media session.

A User Datagram Protocol (UDP) traceroute is currently used to identify problems in Internet Protocol (IP) networks. The UDP traceroute uses ephemeral source and destination ports and makes special use of the IP Time To Live (TTL) field.

The TTL value in the traceroute is varied to isolate a trouble spot in the IP network. For example, the first traceroute packet is sent with a TTL value of "1". The first node receiving the traceroute packet decrements the TTL value by one. As the TTL value is now zero, the first node sends a fault notice back to the source.

A second traceroute packet is sent with a TTL value of "2". The source expects a fault notice back from a second node receiving the traceroute packet. However, if the fault notice comes back from the first node, or if no fault notice comes back, then a trouble spot in the network can be isolated somewhere between the first node and second node.

One problem is that UDP traceroutes are not effective in detecting network problems for IP media streams. This is because the UDP traceroute packets do not necessarily travel along the media path used by the IP media stream. Thus, it does no good identifying a problem node in a network, if the identified node is not used by the media stream.

The UDP traceroute packets also cannot pass through firewalls that may exist between a source endpoint and a destination endpoint for the media session. Since UDP traceroute packets may not be able to travel the entire path from the source endpoint to the destination endpoint, they are unreliable for analyzing the entire media path for IP media streams.

The present invention addresses this and other problems associated with the prior art.

SUMMARY OF THE INVENTION

Media packets are sent with modified Time To Live (TTL) values to intentionally cause rejection of the media packets at intermediate nodes in a media path. Rejection notices caused by the TTL modified media packets are then analyzed to isolate Quality of Service (QoS) problems in the media path.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a block diagram showing in more detail how the media trace packets operate in a media path.

DETAILED DESCRIPTION

Figure 1:
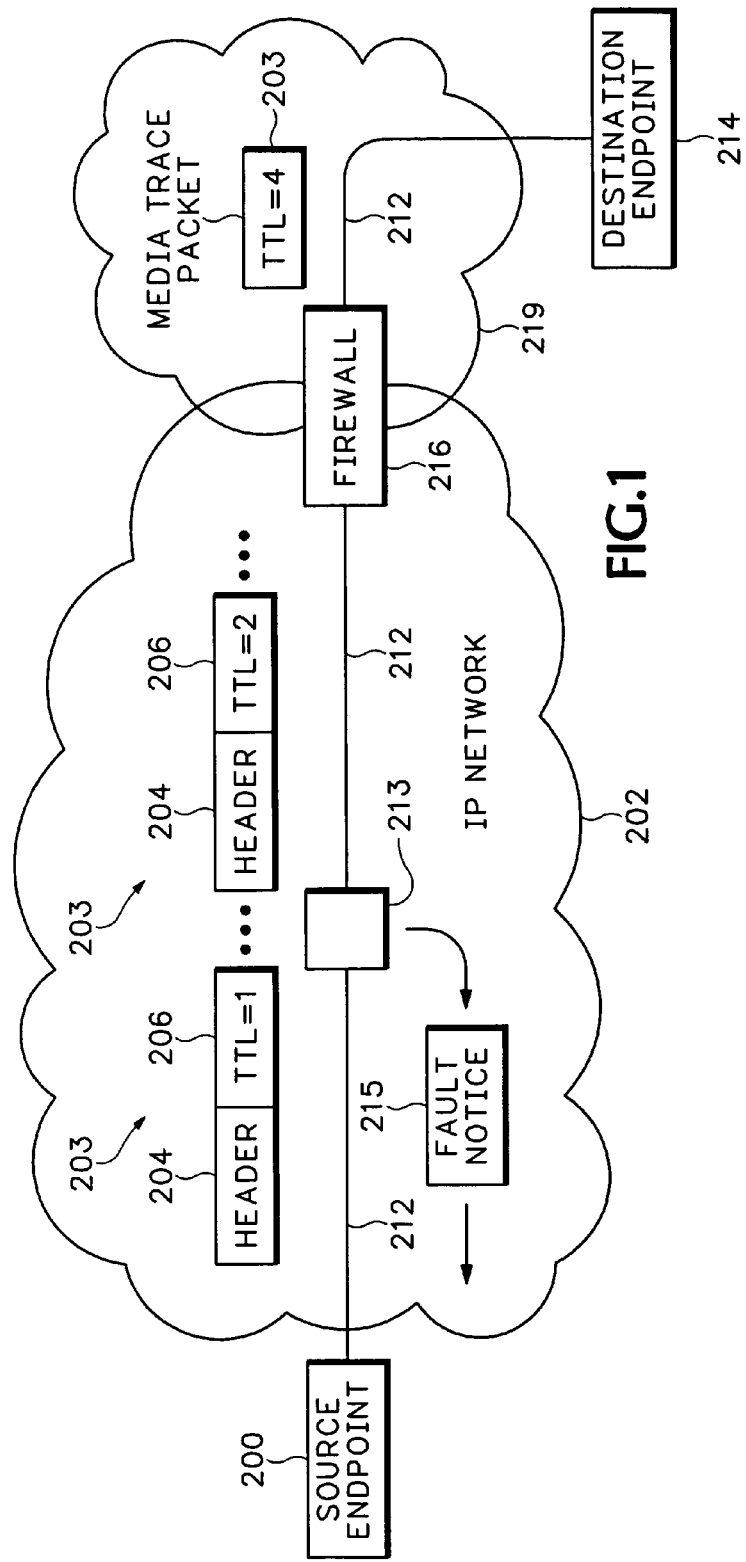
FIG. 1 is a diagram of a system that uses media trace packets to identify problems in a media path.

Referring to FIG. 1, media trace packets 203 are used for analyzing a media path 212 in an Internet Protocol (IP) network 202. The media trace packets 203 have the same information in header 204 as regular media payload packets. Therefore, the media trace packets 203 will travel along the same media path 212 as media packets that are actually carrying a media payload. Specific Time To Live (TTL) values are set in the header TTL field 206 that intentionally cause faults in intermediary nodes, such as node 213, in the media path 212. The intermediary node 213 in response sends a fault notice 215 back to the source endpoint 200. The fault notice 215 is used for conducting QoS analysis of the media path 212.

One application for the media trace packet 203 is in the Real Time Transport Protocol (RTP), which is described in RFC 3550. The RTP protocol is used for carrying a real time media stream over the IP network 202. The media stream can contain any type of real time media, including audio, video, real time text transmission, or voice-band data such as fax or modem information.

In one example, the source endpoint 200 initiates a RTP media call to a destination endpoint 214. The source endpoint 200 may conduct a call Quality of Service (QoS) reservation, such as Resource Reservation Setup Protocol (RSVP), for the media path 212. After the media path 212 is reserved, the source endpoint 200 sends out the media trace packets 203. The media trace packets 203 have essentially the same RTP header information as conventional RTP media payload packets but with small TTL values that cause rejection by intermediate media path nodes.

Because the headers 204 have similar information as conventional RTP packets, the media trace packets 203 travel over the same media path 212 as RTP packets carrying actual media payloads. The RTP header 204 also allows the media trace packets 203 to pass through a firewall 216 to a subnet 219 and conduct further analysis for the remainder of the media path 212 between the firewall 216 and the destination endpoint 214.

The endpoints 200 and 214 include any combination of hardware and software for receiving or sending a media stream over a media path 212 in the IP network 202. The endpoints 200 and 214 may comprise voice gateways that receive calls on behalf of other devices. For example, the gateway can establish IP media sessions on behalf of Plain Old Telephone Service (POTS) phones, Private Branch Exchanges (PBXs), etc. Other endpoints can include Voice Over Internet Protocol (VoIP) phones or computers coupled directly to the IP network 202.

Media Trace Packets

The media trace packets 203 look exactly like normal voice RTP packets with the same Differentiated Services Code Point (DSCP) bits, same Class of Service (CoS) bits, and same UDP ports. Except the media trace packets 203 have a different SSRC value because the time reference will be different. That is, the media trace packets 203 typically will not be sent at 10 millisecond (ms) intervals like conventional media packets.

When the media trace packets 203 have a sufficiently-large TTL value, the media trace packets will be received by the destination endpoint 214. When the destination endpoint 214 receives the packet, it must respond to the source endpoint 200. With traditional UDP traceroute, this response is typically an ICMP 'port unreachable' error, which indicates to the source endpoint that the TTL value is large enough to communicate with the remote station. However, because the destination endpoint 214 is actually listening for incoming packets, it won't generate the traditional ICMP 'port unreachable' error, and must provide a different indication. This different indication is described in U.S. patent application Ser. No. 10/723,118, filed Nov. 26, 2003 which is incorporated by reference.

In one example, several media trace packets are sent, each with incrementally increasing TTL values in the TTL field. This causes each intermediate router in the media path 212 to send back an Internet Control Message Protocol (ICMP) "time exceeded" error code when the router decrements the TTL value to zero. Multiple packets with the same TTL value can also be sent to measure jitter up to the point where the media trace packet is rejected in the network.

For example, referring to FIG. 2, the source endpoint 200 sends out a first media trace packet 220 having a TTL value of "X". The TTL value X is typically a small value that can only be processed by one or a few network processing devices before the media trace packet 220 is rejected and an error notice sent back to the source endpoint 200. For example, the source endpoint 200 may start with a TTL value of X=1. After sending several media trace packets, the source endpoint 200 may increment the TTL value by one (TTL=X+1), until a particular TTL value is sufficiently large to reach the destination endpoint 214. For the remainder of the explanation below, it is assumed that the initial TTL value is TTL=1, and the TTL value is incremented by one every predetermined number of media trace packets.

The first media trace packet 220 with TTL=1 is sent over the media path by the source endpoint 200. The first network node 226 receiving the media trace packet 220 decrements the TTL value TTL=1 by one. Because the TTL value is now zero, the network node 226 discards the media trace packet 220 and sends a reject notice 225 back to the source endpoint 200. The reject notice 225 may contain a portion of the media trace packet 220 payload. This allows the source endpoint 200 to correlate the reject notice 225 with specific sent media trace packets.

The source endpoint 200 then sends one or more media trace packets 222 at a next incremented TTL value. In this example, the TTL value is incremented by one to the value TTL=X+1=2. The source endpoint 200 sends out a media trace packets 222 with value TTL=2.

The first network node 226 decrements the media trace packet 222 by one to TTL=1. The network node 226 could decrement the TTL value of media trace packet 222 by more than one if there is a large amount of processing delay. Therefore, it is possible, that the network node 226 could decrement the TTL value TTL=2 to zero. In this case, the network node 226 would send a reject notice back to the source endpoint 200 for the media trace packet with an initial TTL value TTL=2. If the source endpoint 200 receives reject notices back from network node 226 for TTL=2, a network problem is identified for network node 226.

However, in a normally operating network, the first network node 226 decrements the TTL value in media trace packets 222 by one to the value TTL=X−1=1, and forwards the media trace packet 222 to the next hop in the media path. In this example, a second network node 232 receives the media trace packet 222 and decrements the TTL value a second time to TTL=X−2=0. Because the TTL value is now zero, the network node 232 sends back a reject notice 230 back to the source endpoint 200 for the media trace packet 222.

The source endpoint 200 then sends out a next set of media trace packets 224 with a next incremented TTL value TTL=3. This process is repeated until a set of media trace packets reaches the destination endpoint 214. Thus, QoS information is obtained for each link and node in the media path between the source endpoint 200 and the destination endpoint 214.

Figure 3A:
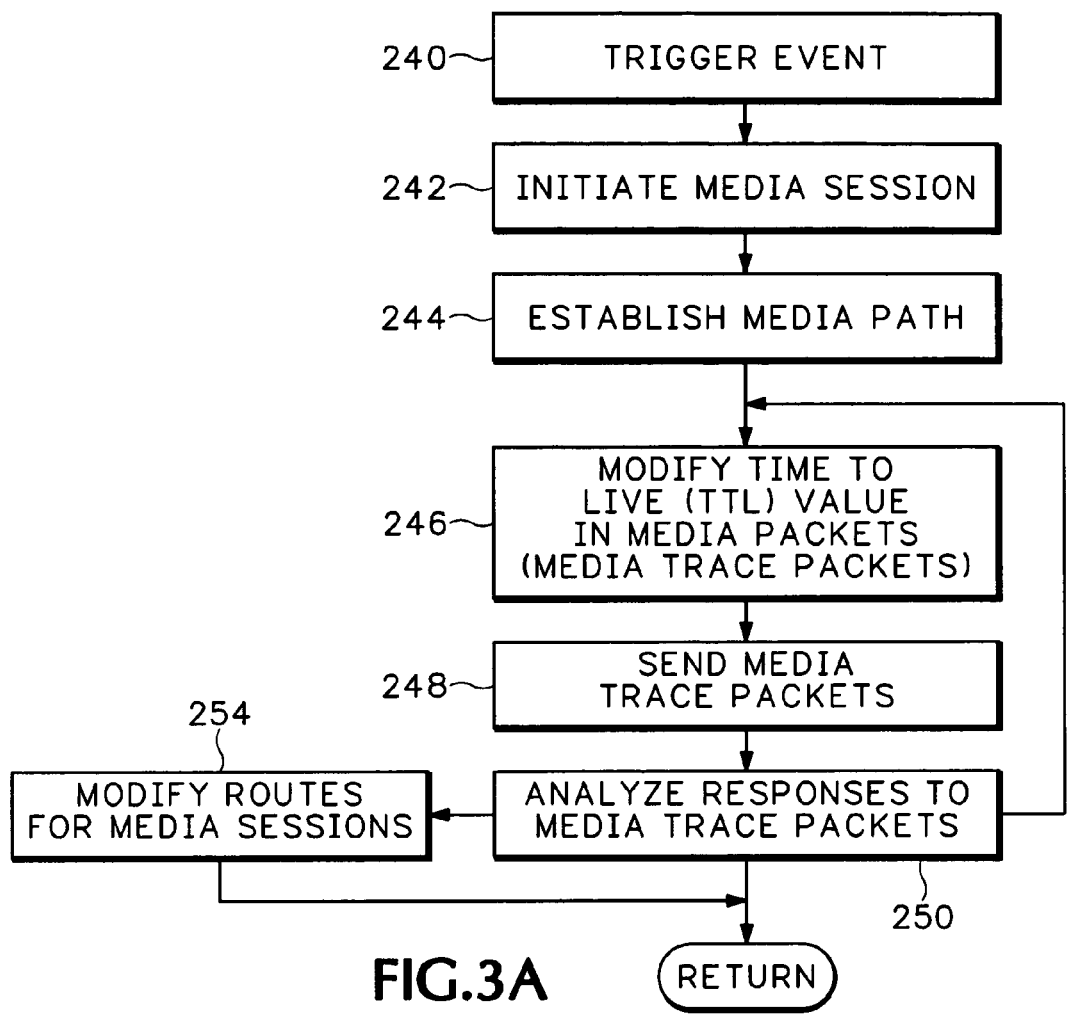
FIG. 3A is a flow diagram showing how the media trace packets are processed at an endpoint.

FIG. 3A shows one example of how the media trace packets are used to analyze and modify a media path. In block 240, the source endpoint, such as a VoIP phone, gateway, server, router, switch, etc., receives a triggering event. The triggering event may simply be a timer that causes the endpoint in block 242 to automatically start a media path analysis session. For example, the endpoint may be programmed to conduct the analysis session late at night when there is less traffic on the IP network. Alternatively, the triggering event in block 240 may be a network administrator manually typing a command that initiates the media session in block 242.

In block 244, a media path is established with a destination endpoint. This may include conducting a RSVP reservation or conducting some other type of QoS reservation protocol. After the media path is established, the TTL values in the RTP payload packets are modified in a variety of different possible ways in block 246 for analyzing the media path. For example, the TTL technique shown in FIG. 2 could be used for media path analysis. However, other ways of varying the TTL values can also be used. The media trace packets are sent out on the IP network in block 248.

The responses from the intermediate nodes in the media path are analyzed in block 250. A predetermined sequence of TTL values could be used in block 246 in the media trace packets and then the responses recorded for analysis by the network administrator. Alternatively, in block 246 a program could dynamically modify the TTL values according to the responses from previously sent media trace packets analyzed in block 250. In another embodiment, the network administrator could manually modify the TTL values in block 246 according to the responses received in block 250.

For example, if a particular intermediate network node sends back reject notices for an unexpected TTL value, extra media trace packets could be sent at the same TTL value to verify the network response. A set of media trace packets could also be sent at a very large TTL value to determine if the same intermediate network node continues to send back rejection notices.

According to the automatic or manual analysis conducted in block 250, the preset media path taken by the media streams may be either manually or automatically reconfigured in block 254. For example, all further media calls may be initiated through a different Internet Service Provide (ISP)

when the rejection notices from the current media path indicate excessive delay, jitter, dropped packets, indirect media paths to a destination endpoint, etc.

Figure 3B:
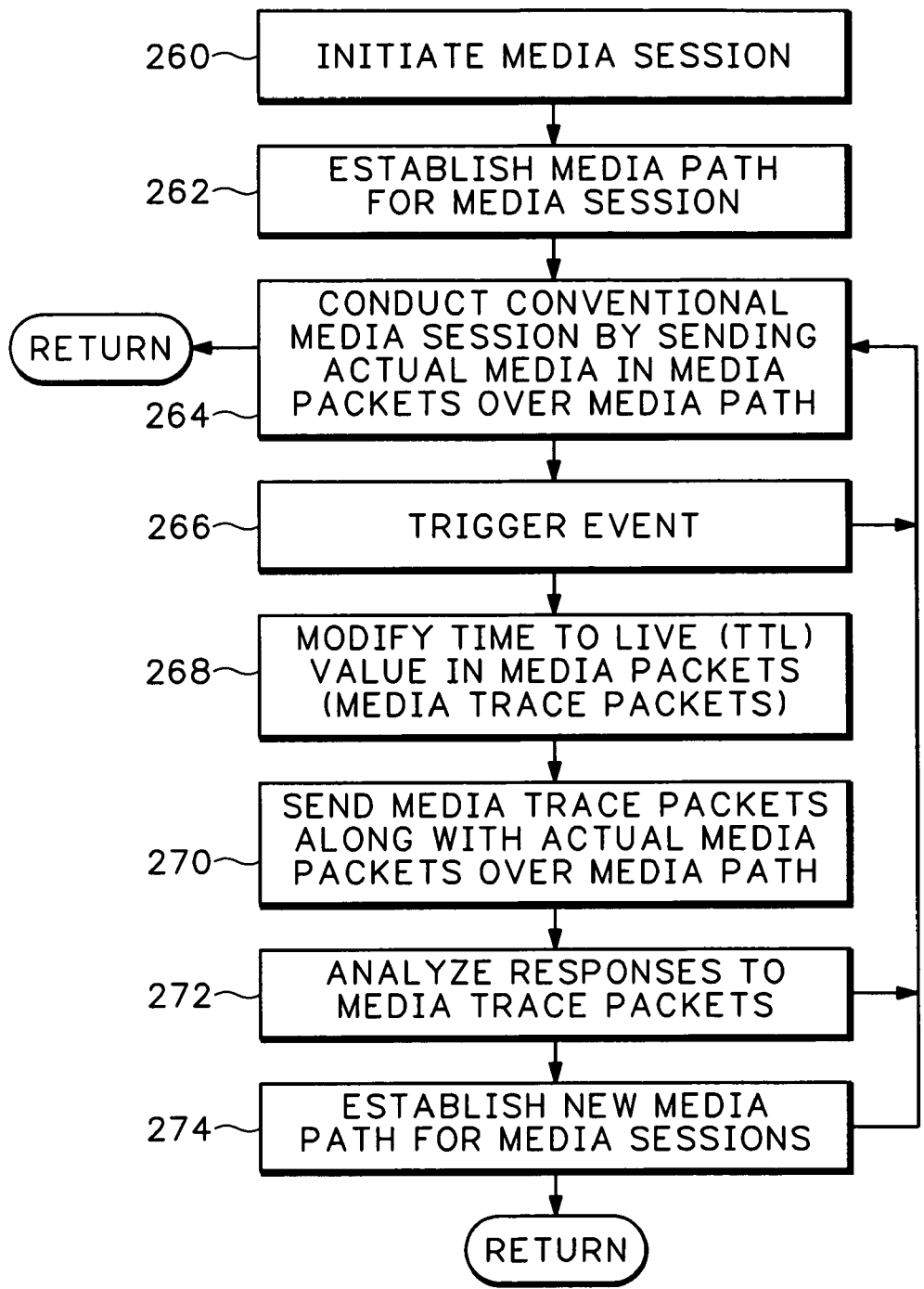
FIG. 3B is a flow diagram showing another embodiment of how the media trace packets are processed at an endpoint.

FIG. 3B shows another application where the media trace packets are sent out at the same time that actual media payload packets are being exchanged between two endpoints. A conventional media session for transporting an actual media stream is initiated in block 260. For example, a user may dial a destination phone number that initiates the media session. A media path for the media session is established in block 262. A conventional media session is then conducted between two endpoints in block 264. For example, the two endpoints may conduct a VoIP phone call, or a media server may provide an audio and/or video media stream to a requesting endpoint, etc.

In block 266 one or both of the endpoints monitor the actual media packets for a triggering event. A triggering event for example may be a particular number of dropped media payload packets, a large packet delay, or a large amount of media packet jitter detected between the two endpoints. In one example, contents of Real Time Control Protocol (RTCP) reports are used to identify triggering events. If no triggering event is detected in block 266, conventional media payload packets continue to be transferred in block 264. Other ways of identifying triggering events are known to those skilled in the art and therefore are not described in further detail.

If one of the triggering events is detected in block 266, media trace packets are generated in block 268. The TTL values and SSRC values for the media trace packets are modified from the conventional media payload packets. The media trace packets are then sent out in conjunction with the actual media payload packets in block 270. Alternatively, the media trace packets are sent out after the media call has finished or when there is a detected silence period or non-transmission period in the current media session. The responses to the media trace packets are analyzed in block 272.

The analysis for the media trace packet responses may be recorded for future review by the network administrator. The media session with the actual media payload packets is then continued in block 264. Alternatively, if the analysis in block 272 indicates a media path problem, a new media path may be established either for the present call or for future calls in block 274. For example, new media sessions may be routed around an identified network node. The media sessions are then continued in block 264.

Figure 4:
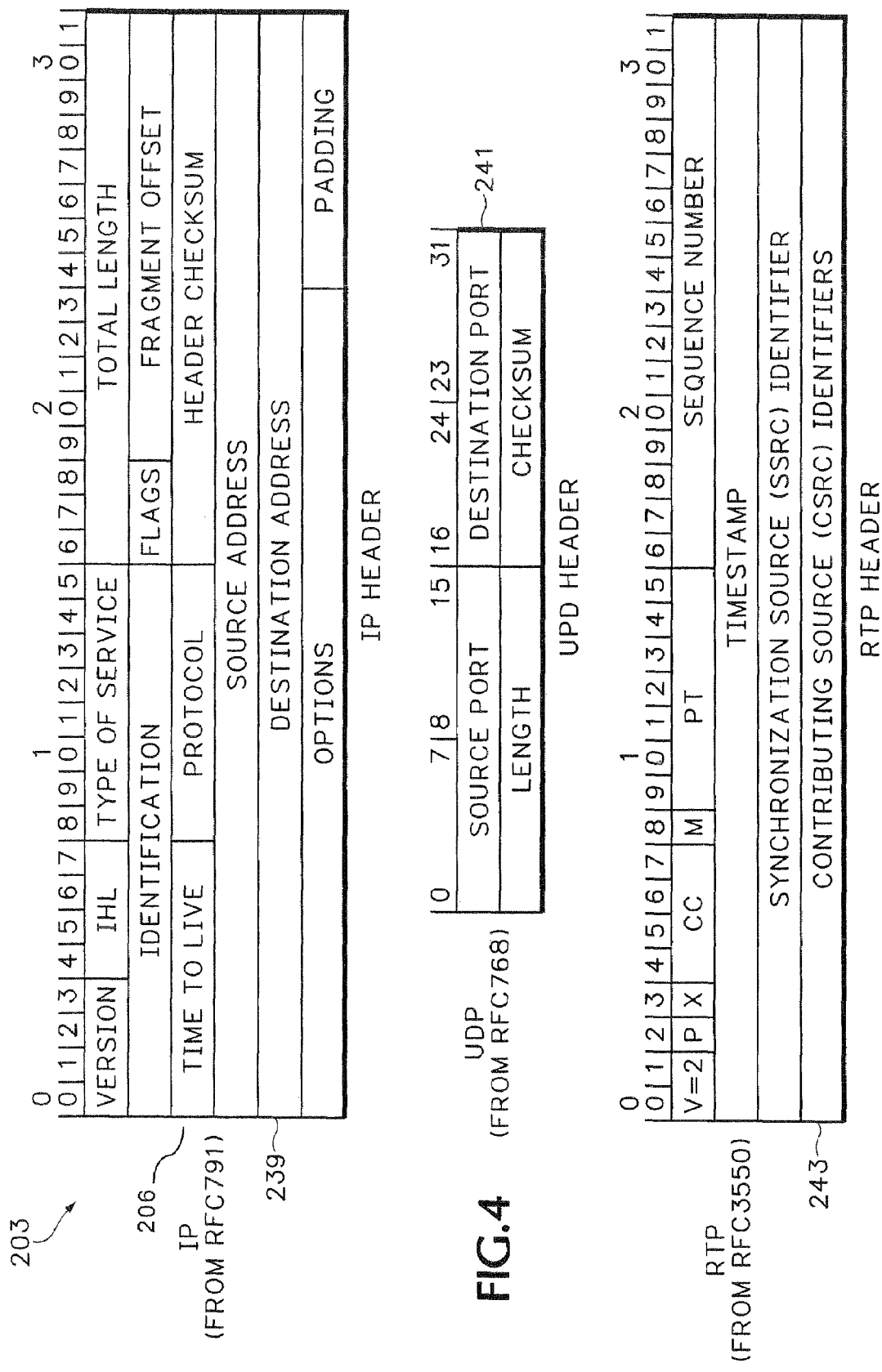
FIG. 4 is a diagram of a Real Time Protocol (RTP) media trace packet.

FIG. 4 shows the TTL field 206 in an IP packet 203. The IP packet 203 consists of a IP header 239, UDP header 241, and an RTP header 243. RTP is carried in UDP which is carried in IP. The IP fields in the IP header 203 are described in RFC791, the fields in the UDP header 241 are described in RFC 768 and the fields in the RTP header 243 are described in RFC 3550 which are all herein incorporated by reference.

The TTL field 206 is manipulated as described above for conducting the media path analysis. The value in the TTL field 206 indicates the maximum time the datagram is allowed to remain in the internet system. When this field is decremented to the value zero, then the datagram is destroyed. The TTL field 206 is modified during internet header processing.

The time is measured in units of seconds, but since every module that processes a datagram must decrease the TTL by at least one even if it processes the datagram in less than a second, the TTL value should be thought of as a "hop count" and as an upper bound on the time a datagram may exist.

A network node processing the media trace packet does not send a datagram with a TTL value of zero and does not discard a datagram just because it was received with a TTL value of 1. The IP layer provides a means for the transport layer to set the TTL field 206 of every datagram that is sent. If a received datagram has a TTL value of zero, the datagram will be discarded by a gateway but not by the destination host. Thus, the media trace packet 203 allows the sender to determine the currently-used path for the RTP flow and the delay and jitter contribution along the path. Alternatively, the endpoint (IP phone, Public Switched Telephone Network (PSTN) gateway, dedicated diagnostic device, etc.) could send the media trace packet 203 at the beginning or end of a call to collect information about the underlying network.

The media trace packet 203 works through firewalls and Network Address Translators (NATs), since there are already pinholes for the UDP ports for the RTP stream. The media trace packet 203 is also guaranteed to use the same path as the RTP stream.

The media trace packet 203 can be used in VoIP phones with user initiation or with automatic initiation and in IP gateways with automatic initiation via signaling or Digital Signal Processing (DSP) error thresholds. This analysis technique is also useful for a dedicated diagnostic device, or a device possibly integrated into a router which generates synthetic calls. Low volume noise may be inserted into the media trace packet payloads so that any media trace packets reaching the destination endpoint do not annoy the listener.

Any exposure to Denial of Service (DoS) attacks for the RTP packets would be the same as current RTP packet attackers. Mitigation of the DoS attacks could be provided by rate limiting ICMP, or rate limiting packets with abnormally-small TTL values.

Using Media No-Op Packets for Media Path Tracing

The media trace packets can be used in combination with a media payload type referred to as a no-op payload packets or simply no-op packet. One application for the no-op packet is in the Real Time Transport Protocol (RTP), which is specified in RFC3550. The no-op payload packet, when used in RTP, is referred to as an RTP no-op packet. The no-op packet in one embodiment has no media payload and uses a one-bit opcode in the RTP payload for requesting a media path continuity report. The TTL fields in the no-op packet can be varied as described above in FIGS. 1-4 in order to analyze intermediate nodes and links in the media path.

The no-op payload packets are literally a no-op coder. When negotiated through a Session Description Protocol (SDP-RFC2327), H.245, or some other media description protocol, any sender is able to send RTP packets with this coder. Any receiver expressing a willingness to receive this coder processes the RTP no-op packets according to the basic RTP specification and then discards the RTP no-op packets without performing actual media play-out.

The RTP no-op packets allow the instrumentation mechanisms in RTP, namely the information in Real Time Control Protocol (RTCP) reports, to be evaluated prior to actually sending voice, audio, or other media in an RTP session. For example, an implementation may decide that the media stream is not sent for this session if the RTCP report indicates a low quality media path.

Figure 5:
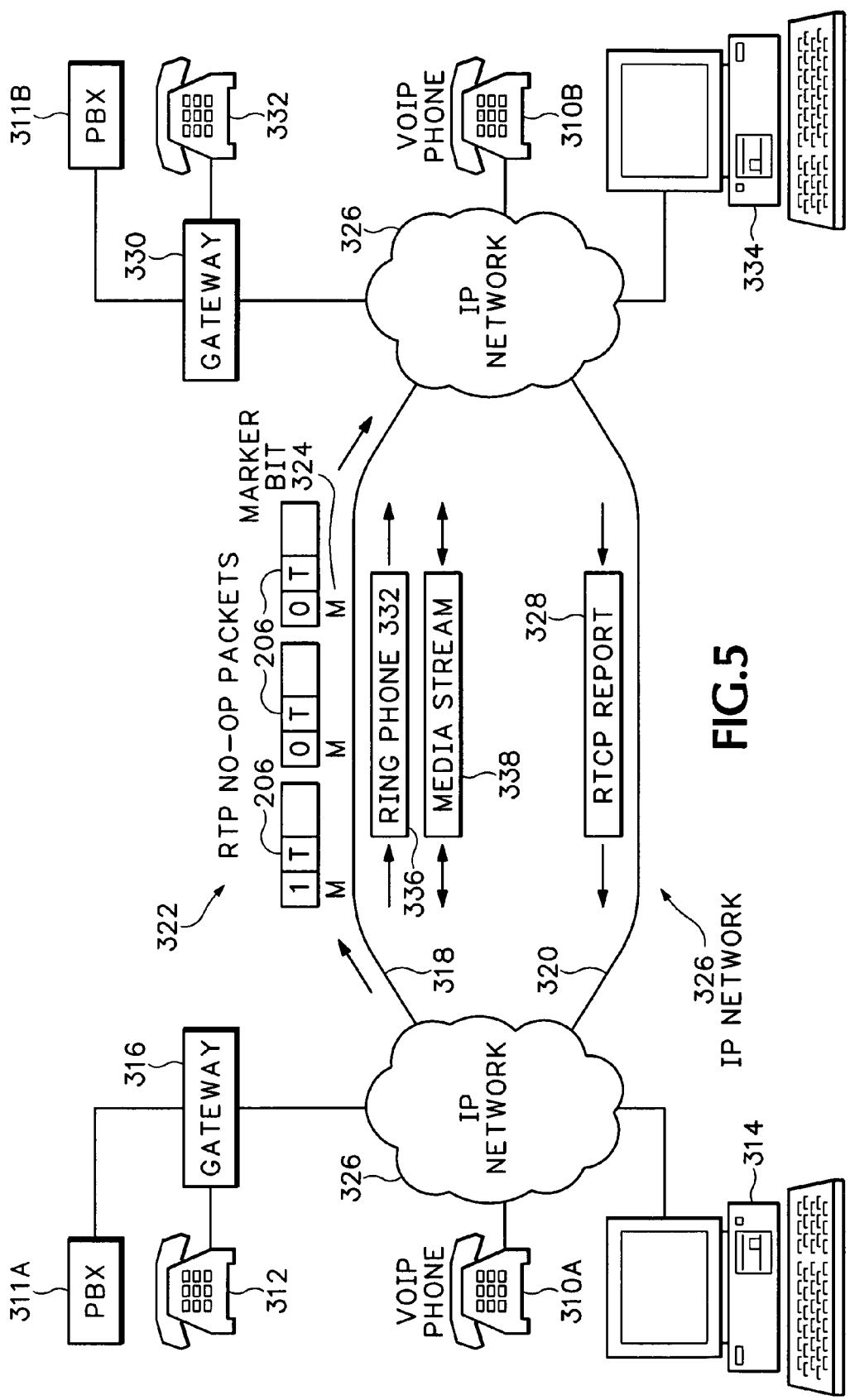
FIG. 5 is a block diagram showing how no-op payload packets are used in combination with media trace packets.

FIG. 5 shows a Wide Area Network (WAN) or Local Area Network (LAN) referred to generally as IP network 326 that is used for transferring a real time media stream 338. Plain Old Telephone Service (POTS) phone 312, Private Branch Exchange (PBX) 311A, etc. are coupled to the IP network 326 through gateway 316. Another POTS phone 332, PBX 311B, etc. are coupled to the IP network 326 through gateway 330. Voice Over Internet Protocol (VoIP) phones 310A and 310B and computers 314 and 334 are coupled directly to the IP network 326.

Any of the voice gateways 316, 332, VoIP phones 310A, 310B, and computers 314 and 334 include any combination of hardware and software for receiving or sending a media stream 338. The media stream 338 can include any real time media such as audio data, video data, and real time text such as the text used for the hearing impaired.

Any combination of the phones 310A, 310B, 312, and 332; PBXs 311A and 311B; computers 314 and 334; and gateways 316 and 330 are referred to below generally as endpoints, users, senders or receivers, etc. One of the endpoints initiates a media call to another endpoint. If one of the phones 312 or 332 initiates the call, the gateway 316 or 330, respectively, would make the VoIP call on behalf of the phone. For example, the phone 312 may make a VoIP phone call to phone 332. A caller dials a phone number using phone 312 and the gateway 316 then determines the IP address for the gateway 330 serving phone 332. The two gateways 316 and 330 then conduct a signaling protocol for establishing the VoIP call between phone 312 and phone 332.

In another scenario, the computer 314 may want to receive a video stream or audio stream from computer 334 which operates as a music and video content server. In another scenario, the computer 314 may wish to make a VoIP call to VoIP phone 310B. The computer 314 initiates the media connection to VoIP phone 310B. The computer 314 may establish the media connection through a gateway or may access VoIP phone 310B through the IP network 326, without using a gateway. Media connections can also be initiated from any of the other devices 310A, 310B, 311A, 311B, 332, or 334.

In the example described below, the phone 312 initiates a VoIP phone call to phone 332. For clarity, operations will be described as being performed by the phones 312 and 332. However, some of these operations could be performed by the gateways 316 and 330. The phone number for phone 332 is entered at phone 312. There may be an intermediary device, such as a call controller that determines the IP address for gateway 330 or phone 332 based on the phone number dialed by phone 312. During this initial signaling, the two gateways 316 and 330 agree to use the no-op payload packet verification process described below.

Prior to transmitting the media stream 338, gateway 316 sends one or more no-op payload packets 322. In this example, the no-op payload packets are RTP no-op packets and three of the RTP no-op packets are sent from gateway 316 to gateway 330. However any type of no-op payload packets 322 can be sent depending on the media stream carrier protocol. Any number of the no-op payload packets can be sent by gateway 316. However, the number of no-op packets should be limited to prevent substantial delay in completion of the call setup.

The RTP no-op packets 322 have the same format as conventional RTP packets except that the packet payload contains no media. In the example shown, a marker bit 324 in the packet payload is not set in the first two RTP no-op packets 322 but the marker bit 324 is set in the third RTP no-op packet 322. It should be understood that this is only one example and any number of no-op packets 322 can be sent. For example, in other implementations less than three, or more than three, no-op packets are sent with the last no-op packet having a set marker bit 324. In another example, only one no-op packet is sent with that single no-op packet having a set marker bit.

When the gateway 330 receives the RTP No-Op packet with the marker bit set, the gateway 330 immediately generates an RTCP report 328 that includes Quality of Service (QoS) data for all of the RTP no-op packets 322 previously received. The RTCP report 328 is generated in the same manner used for generating RTCP reports for conventional RTP packets containing media payloads. For example, the phone 332 may count the number of received RTP no-op packets 322 as well as tracking latency and jitter statistics.

The RTCP report 328 would normally be sent by gateway 330 to gateway 316 about every 5 seconds. However, the set marker bit 324 in the RTP no-op packet 322 causes the gateway 330 to immediately send the RTCP report 328 to gateway 316. In this example, the RTCP report 328 would indicate that three RTP packets were received by gateway 330 if no packets were lost or unduly delayed. If the information in RTCP report 328 indicates the media path 318 carrying the RTP no-op packets 322 is operating adequately, signaling 336 is sent causing phone 332 to ring. This can be the unmodified "alert" signaling, or could be QoS-aware signaling using preconditions as described in RFC3312. Then the two phones 312 and 332 start sending the real time media stream 338.

If the RTCP report 328 indicates that the media path 318 is not operating adequately the signaling protocol is so informed, and can take action based on local or global policy. Possible policies include, but are not limited to: aborting the call such that the phone 332 does not ring, continuing with the call but making note to the accounting and billing system that the call may have to be discounted due to poor quality, or eliminating the problematical media stream if the call carries multiple media streams (e.g. audio and video).

In the case where the call is aborted, the aborted call may be established over an alternate path in IP network 326 or over an alternative medium, such as over a circuit switched network. A poorly performing media path may be identified when the RTCP report 328 indicates that fewer RTP no-op packets were received by gateway 330 than were sent by gateway 316. A media path problem may also be identified in the RTCP report 328 if the amount of latency or jitter in the RTP no-op packets 322 is outside of some expected range. In another scenario, a bad media path is indicated when the RTCP report 328 is not received by gateway 316 within some amount of time after gateway 316 sends out an RTP no-op packet 322 with the set marker bit 324.

The no-op packet call verification process described above can be performed independently for each endpoint. For example, in a bidirectional transmission, such as with a phone call between phones 312 and 332, each phone can make a determination whether or not to establish the call based on the information in the RTCP report 328 received from the other phone or gateway, or the lack of a RTCP report 328.

If the media transmission is unidirectional, then only one endpoint may need to verify the media channel. Unidirectional media transmissions are used for music or video streams transmitted unidirectionally from a media server to a user. In this application, only the path from the media server to the user is important for media quality considerations. Thus, only the user receiving the media stream needs to send RTP no-op packets and evaluate the RTCP report 328 sent by the media server.

Modifying Time to Live in RTP No-OP Packets

The RTP no-op packets 322 can serve the dual purpose of both indicating an acceptable media path between two endpoints as described above in FIG. 5 and can also be used for analyzing intermediate links and nodes in the media path 318 as described above in FIGS. 1-4.

The TTL field 206 in no-op packets 322 can be changed to low values that would cause the no-op packets 322 to be rejected by intermediate nodes in media path 318. The endpoints receiving the rejection notices can isolate any problems in the media path 318.

In one example, the source endpoint sends out the RTP no-op packets 322 with a relatively large value in TTL field 206. The TTL value is set large enough so that in a normal operating condition the no-op packets 322 reach the destination endpoint before being decremented to a zero value by an intermediate network node. For example, the TTL value may be set to a standard preconfigured value of 32 or 64. In a normal operating condition, the destination endpoint receives the RTP no-op packets 322 and sends back an associated RTCP report 328. If the RTCP report 328 indicates a properly operating data path 318, the source endpoint starts sending the media stream 338.

However, if the RTCP report 328 indicates a problem with the media path 18, the source endpoint can start modifying the TTL values 206 in no-op packets 322 in order to isolate the media path problem. For example, the RTCP report 328 may indicate that some of the sent no-op packets 322 were not received or that there was an unusually large delay in receiving the no-op packets.

The source endpoint then isolates the cause of the media path problem by varying the TTL values in following no-op packets. For example, the TTL value in the next sent no-op packets may be set to one. The source endpoint then waits for an expected rejection notification from the first network node in the media path. The source endpoint can then continue to increment the TTL values by one until the source of the media path disruption is identified. The source endpoint could then either manually or automatically reroute calls around the identified network problem.

Figure 6:
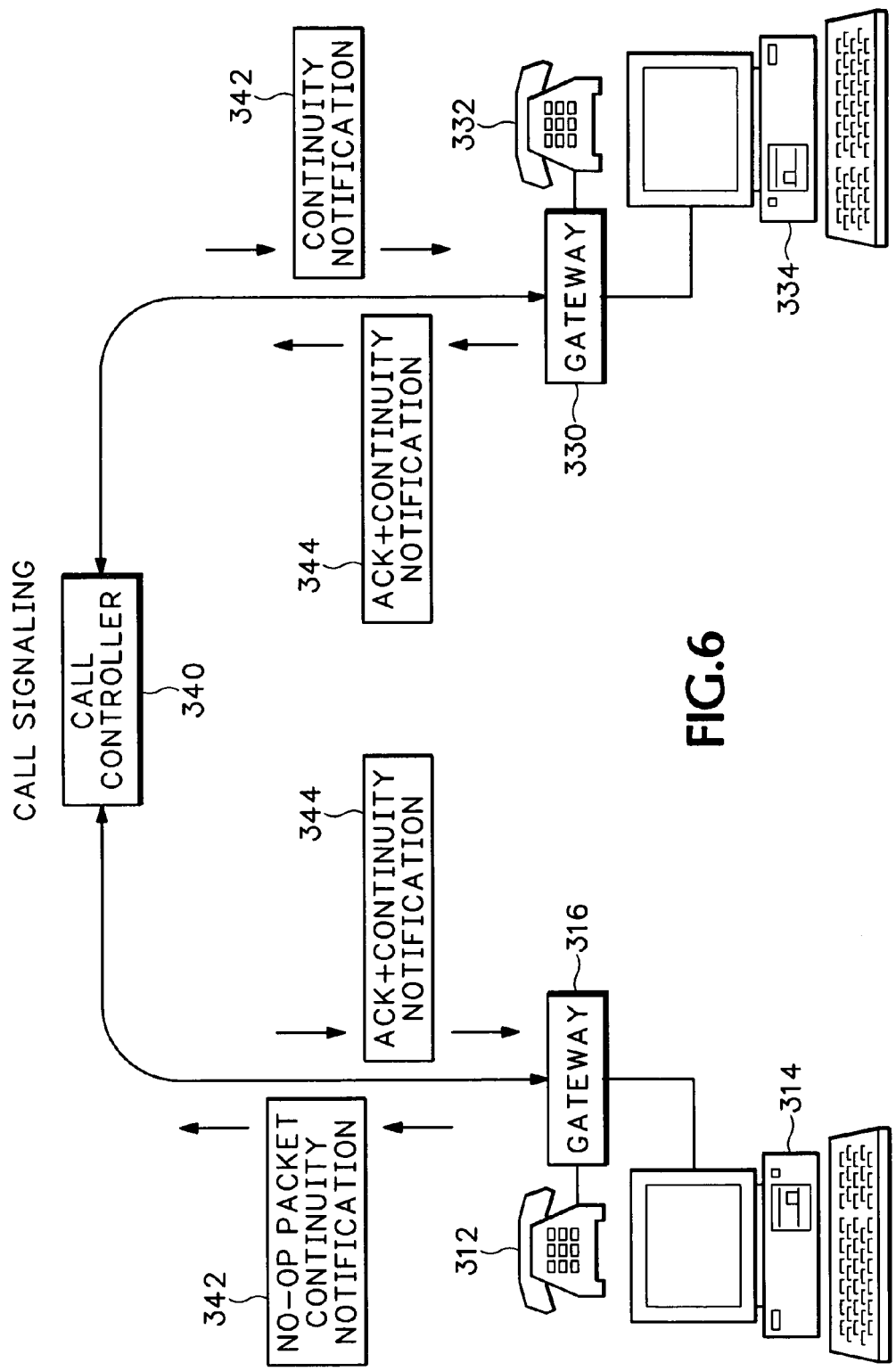
FIG. 6 is a block diagram showing how the no-op packet evaluation scheme is negotiated between two endpoints.

FIG. 6 shows generally how the initial call signaling is conducted between two endpoints. The Request For Comment (RFC) 3312 specifies one example of a real time media signaling protocol. Of course, other types of real time media stream signaling protocols can also be used. Examples of signaling protocols include Session Initiation Protocol (SIP), Session Definition Protocol (SDP) offer-answer, H323, and Media Gateway Control Protocol (MGCP).

Signaling messages 342 are sent from phone 312 to phone 332 prior to transmitting the media stream 338 shown in FIG. 5. The signaling messages 342 include a request or notification that the phone 312 intends to conduct a media path continuity check using RTP no-op packets. The signaling 342 may need to be conducted through a call controller 340. The phone 332 agrees to conduct a continuity check using the RTP no-op packets by sending acknowledgement signaling 344 back to phone 312.

The phone 332 can also send additional notification back to phone 312 in signaling 344 that indicates phone 332 also intends to send RTP no-op packets to phone 312 for continuity checking. The two phones 312 and 332 thus both agree to send and receive the RTP no-op packets 322 (FIG. 5) prior to sending and receiving a media stream.

RTP No-Op Packet Sender

Figure 7:
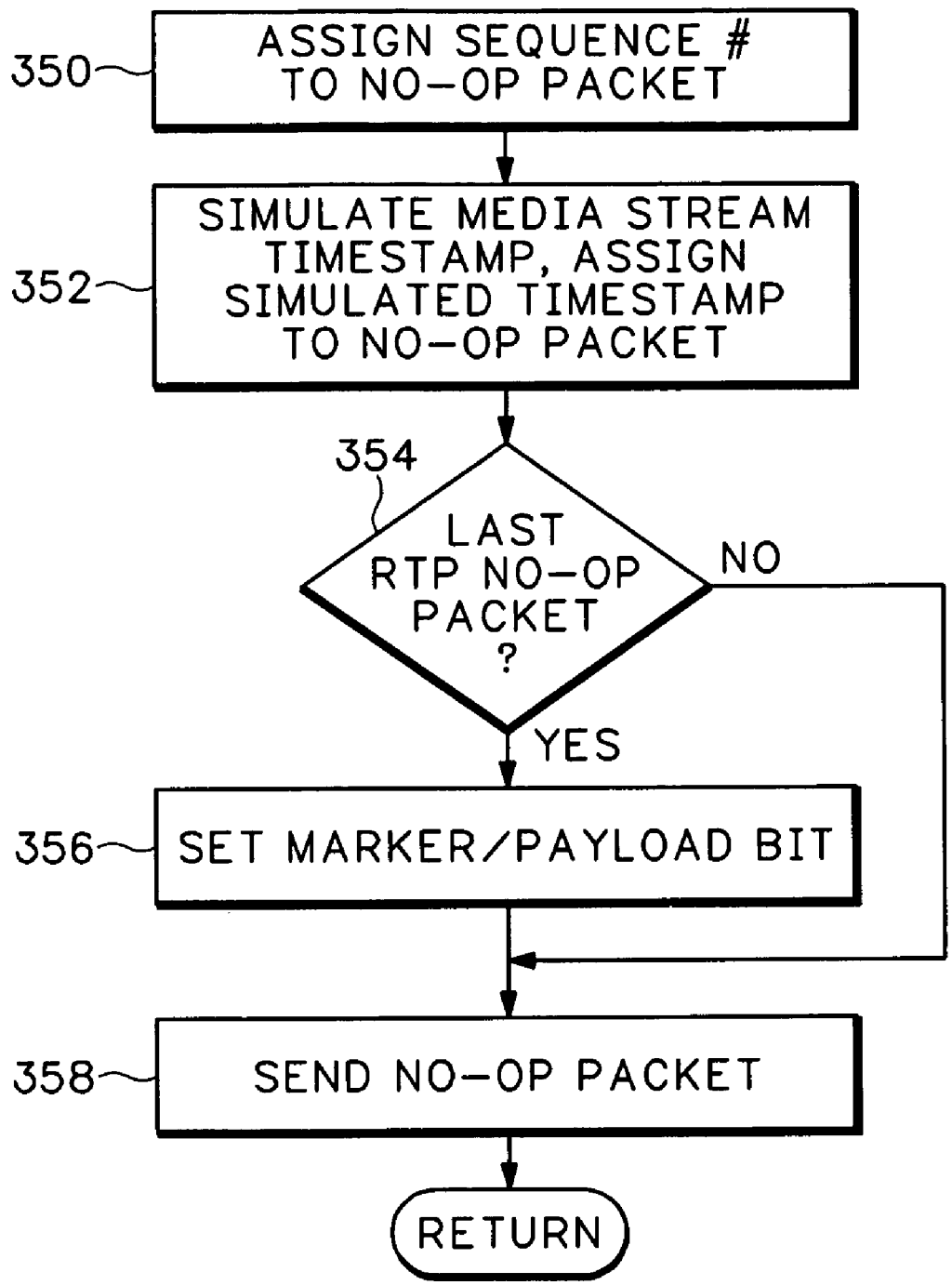
FIG. 7 is a flow diagram showing how the no-op payload packets are generated.

FIG. 7 shows in further detail the sequence followed by the RTP no-op packet sender. In block 350, sequence numbers are assigned to the RTP no-op packets starting at the next sequence number for the RTP session. The sequence number for each no-op packet is incremented by one in accordance with the RTP specification. In block 352, a timestamp is inserted into the no-op packet according to a packet time (ptime) parameter, also in accordance with RTP operation. The ptime parameter is conveyed via the signaling protocol, for example via SDP. It denotes a packetization interval identifying how many milliseconds of media are encoded into a single RTP packet.

The sender identifies in block 354 the last RTP no-op packet to be sent. If it is not the last no-op payload packet to be sent, then the sender transmits the no-op packet in block 358. If it is the last no-op packet, then the sender sets the marker bit in the RTP header of the no-op payload packet in block 356 causing the no-op packet receiver to immediately send back an RTCP report. The RTP no-op packet with the set marker bit is then transmitted to the receiver in block 358.

The RTCP report is sent within the session RTCP bandwidth limits and other RTCP sending rules. The scheme for sending the RTP no-op packets from the opposite end of the call are the same.

RTP No-Op Packet Receiver

Figure 8:
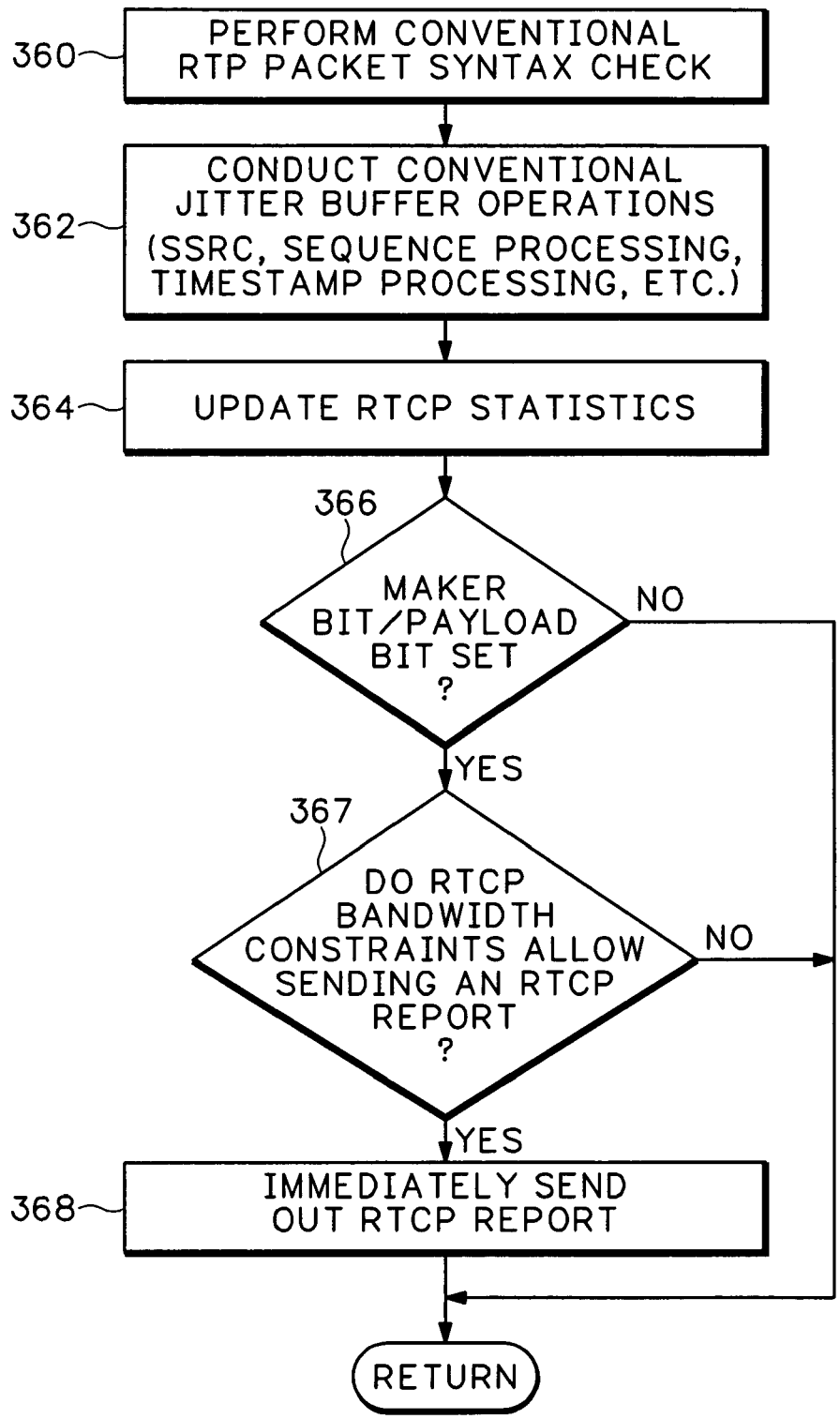
FIG. 8 is a flow diagram showing how a media path is analyzed using the no-op media packets.

FIG. 8 shows in further detail the operations used at the processing device receiving the RTP no-op packets. In block 360, a syntax check is performed on the received RTP no-op packets in the same way as any other RTP payload. In block 362, jitter buffer operations are performed on the RTP no-op packets in the same manner as any other RTP payload. The jitter buffer operations may include Synchronization Source field (SSRC), sequence, and timestamp processing.

In block 364, the RTCP statistics are updated for the RTP no-op packets in the same manner as for any other RTP payload format. If the marker bit in the RTP no-op packet is not set in block 366 or other RTCP sending rules are not met in block 367, the receiver continues to update RTCP statistics for any additionally received RTP no-op packets. If the marker bit is set for a received RTP no-op packet in block 366, other RTCP sending rules are checked in block 367. For example, it is determined if the RTCP bandwidth constraints allow sending the RTCP report. If these RTCP sending rules are met in block 367, the RTCP report is immediately sent to the no-op packet sender in block 68. The receiver rules for the other endpoint are the same.

Media Channel Acceptance

Figure 9:
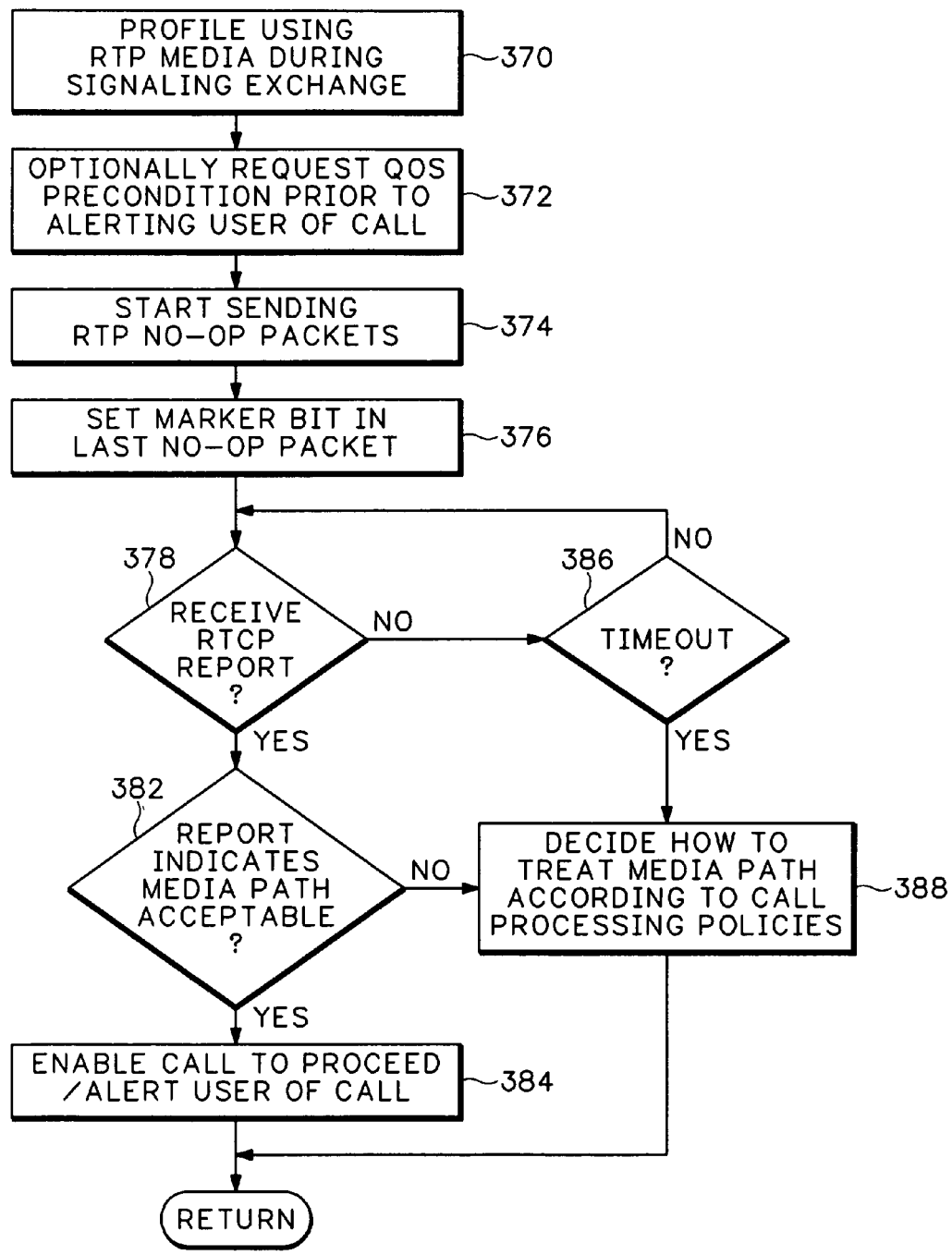
FIG. 9 is a flow diagram showing how analysis information about the media path is used for establishing the media path.

FIG. 9 describes the offer-answer exchange between the two endpoints. In block 370, one of the endpoints proposes using the "no-op" coder and payload format during the session. In one example, an SDP (or H.245) with an offer-answer style exchange is used for conducting the RTP no-op notification.

In block 372, the notification may also optionally carry an RFC3312 precondition to ensure that no user is alerted of a call before the acceptance procedure using the no-op payload packets is successfully completed. The preconditions could be used in either direction, although it may be typical to enforce their use in both directions. For example, when there is an RTP session in both directions of a full-duplex VoIP call, both directions would be required to pass the no-op packet acceptance test.

After completing the first RFC3312 offer-answer exchange, the sender starts sending a configurable number of RTP no-op payload packets to the receiver in block 374. The marker bit is set in the last no-op payload packet in block 376. The receiver conducts the RTCP processing and returns the RTCP report after seeing the set marker bit. If the packet with the marker bit was lost, the RTCP report may be sent after the normal startup RTCP delay interval.

The sender waits for the RTCP report in block 378. If the RTCP report is not received in block 386 within some time period after sending out the last RTP no-op packet (i.e., timeout), the media path is declared unacceptable and the signaling protocol can decide what to do in block 388 according to any range of policies such as the ones described above. Alternatively, the procedure described above is repeated to cover the case of a single RTCP report packet getting lost.

If the RTCP report is received in block 378 within an acceptable time period, the RTCP report is examined in block 382. Depending on the loss and jitter statistics, the receiver either declares the channel acceptable or unacceptable in block 382. If the media channel is deemed unacceptable, the signaling protocol can decide what to do in block 388 according to the predetermined range of policies. If the channel is deemed acceptable, the precondition is marked as satisfied and the sender initiates, or responds to, the second phase of call establishment in block 384 that allows the call to proceed. In particular, one of the endpoints may notify a user of the call by activating an annunciation device.

Figure 10:
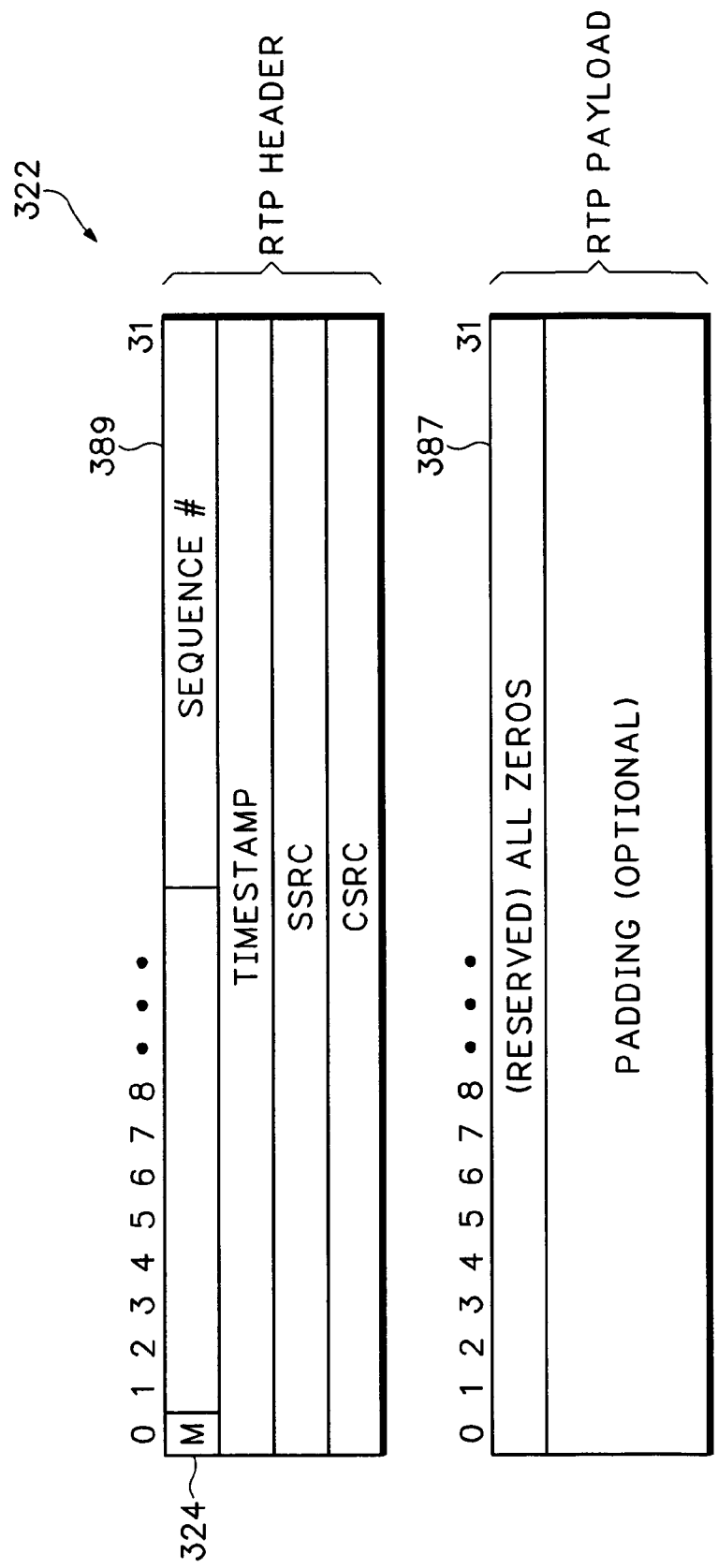
FIG. 10 is a diagram of an RTP no-op packet.

Referring to FIG. 10, the RTP no-op packet 322 is formatted to look like a normal RTP payload packet. This allows the no-op packet to operate and be processed in the same way as a voice, video or other type of RTP media packets. The RTP no-op packet will also take the same path as the RTP packets that are sent after the call is set up. The only difference is that the RTP no-op packets 322, 323, 324 are not played out by the receiver.

The packet header 389 includes conventional RTP header content including a sequence number, timestamp value, synchronization source identifiers and contributing source (CSRC) identifiers. The timestamp value can be the real timestamp used with actual media payloads or the timestamp value can be simulated.

The RTP no-op payload 387 employs the marker bit 324 in the RTP header. If bit 0 is set, the receiver immediately sends out an RTCP report. Bits 1-31 in the payload 387 are reserved and in one example must all be set to zero. Additional padding bytes may be appended up to the negotiated packet time (ptime) value in SDP. Padding may be useful to generate RTP packets that are the same size as other payload, such as a normal voice payload. Of course other formats can also be used in the RTP packet 322 for generating the no-op payload format. If the no-op packet 322 is also used as a media trace packet, the TTL field 206 (FIG. 4) in the IP header for the RTP packet 322 is modified as described above.

Figure 11:
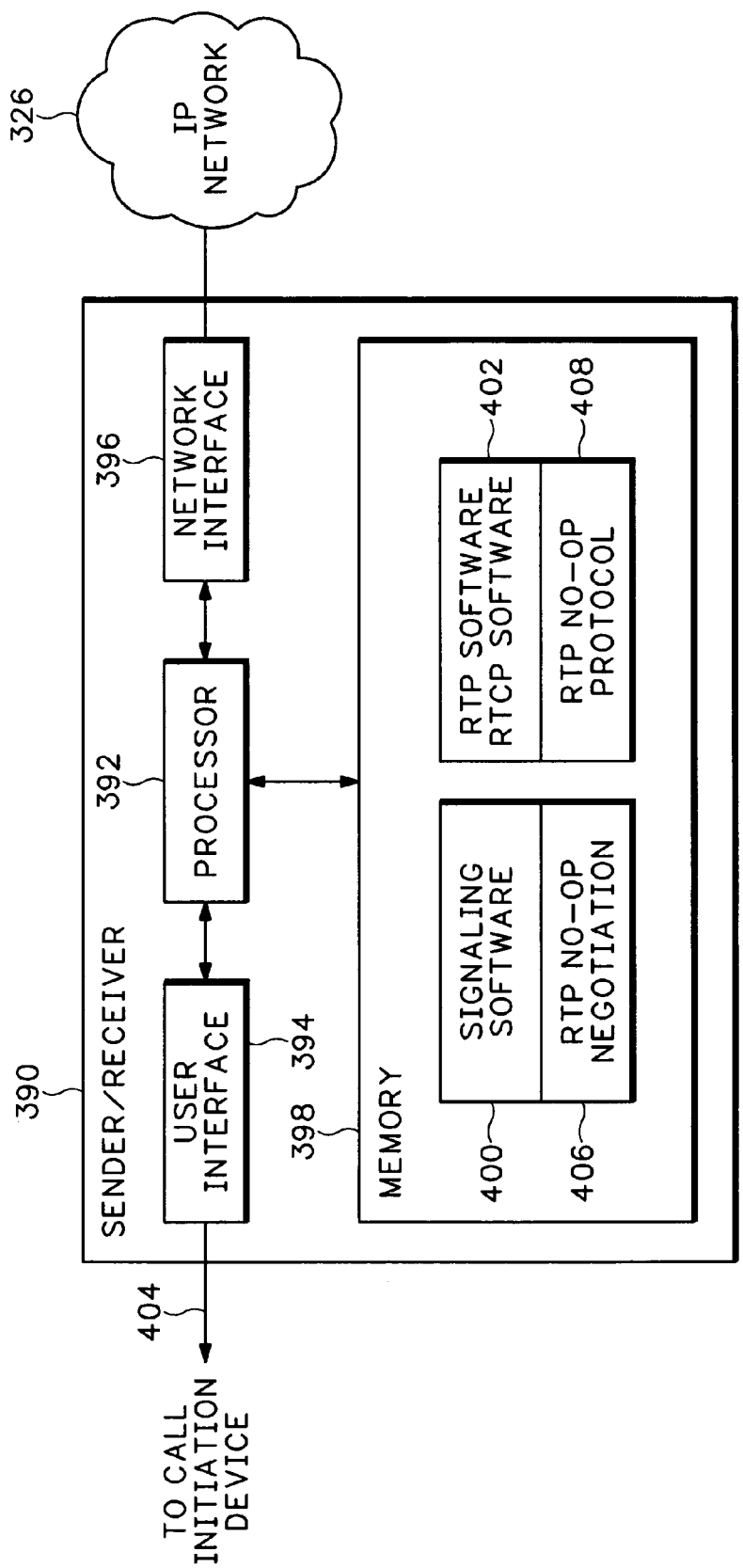
FIG. 11 is a detailed diagram of a network device that processes the no-op packets and the media trace packets.

FIG. 11 shows in further detail the elements in a network device 390 that sends or receives the RTP no-op packets and the media trace packets. The device 390 can provide the functionality in any combination of phones 312 and 332, computers 314 and 334, and gateways 316 or 330 shown in FIG. 5. For example, in one configuration the device 390 is either computer 314 or 334. The computer 314 or 334 performs all of the operations used for conducting the media session, including dialing another telephone or accessing another computer. In another configuration, the device 390 may be the gateway 316 or 330 shown in FIG. 5 and the media session is initiated by a VoIP phone or computer that is connected to the gateway.

A processor 392 is coupled to a user interface 394 and a network interface 396. The network interface 396 connects to the IP network 326. The user interface 394 connects to any device needed to initiate the media connection. For example, user interface 394 could connect to a keyboard or to a phone.

A memory 398 contains executable software that contains both call signaling software 400 and RTP and RTCP software 402. The memory 398 represents any combination of internal memory within the processor 392 or memory external to the processor 392. For example, the memory 398 can be any combination of flash, Read Only Memory (ROM), Random Access Memory (RAM), or disk memory used for containing and executing the signaling software 400 and the RTP and RTCP software 402.

The signaling software 400 is used for establishing the initial media path between the two endpoints. The signaling software 400 includes the RTP no-op negotiation described above. The RTP and RTCP software 402 conducts conventional RTP and RTCP with the addition of conducting media path verification using the RTP no-op packets and responding with RTCP reports as described above.

Thus, the RTP no-op payload format, with the special use of the RTP marker bit and RFC3312-style offer-answer and call signaling preconditions are used to perform channel acceptance testing as part of VoIP call establishment. Standard RTP packets are used rather than something special like a ping or an NSE. The marker bit is used along with RTCP to control the feedback loop.

This no-op payload scheme solves the problem of assessing media connectivity and channel quality in packet switched networks. The no-op scheme can be used in any and all VoIP or media endpoints, but particularly those for sale to and through service providers accustomed to channel assessment capabilities, such as those provided in circuit switched networks. The no-op payload format can also be used for other applications, such as synthetic load testing and to foil traffic analysis.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for analyzing a media path in a packet switched network, comprising:
   providing media trace packets configured to use the same application protocol as actual media payload packets to be sent along the media path and further configured to match, at a protocol layer other than that of the application protocol, a priority indicator to be provided by the actual media packets to specify a desired one of a plurality of priority levels available in the network, wherein the media trace packets have the same class of service bits and same ports as the actual media payload packets, and wherein the media trace packets have a different synchronization identifier than the actual media payload packets;
   varying a Time To Live (TTL) value in the media trace packets to intentionally cause faults at intermediate nodes in the media path; and
   analyzing fault notices received from the intermediate nodes in the media path caused by the media trace packets.

2. The method according to claim 1 including providing media trace packets configured to use Real Time Protocol (RTP) as the application protocol and further configured to use Differentiated Services Code Point (DSCP) bits as the priority indicator.

3. The method according to claim 1 including:
    conducting a media signaling protocol that establishes the media path between a source and destination endpoint;
    using a same media header format for the media trace packets and media payload packets; and
    setting a first set of TTL values in the media trace packets to a low enough value to cause a fault condition in one of the intermediate modes in the media path such that a portion of each media trace packet causing the fault condition is returned in a corresponding reject notice to the source endpoint.

4. The method according to claim 3 including setting a second set of TTL values so that at least some of the media trace packets reach the destination endpoint.

5. The method according to claim 4 including setting a member bit in the media trace packets that cause the destination endpoint to immediately generate, using a Real Time Control Protocol (RTCP), a media path analysis report for the media trace packets.

6. The method according to claim 5 including determining whether or not to transmit a media stream over the media path according to contents of the media path analysis report.

7. The method according to claim 1 including causing the media trace packets to play out low volume noise when received by a destination endpoint by inserting the low volume noise into media payload fields of the media trace packets before sending the media trace packets along the media path, said low volume noise inserted at a quantity creating uniformly-sized trace packets suitable for thwarting traffic analysis.

8. The method according to claim 1 including:
    setting a first TTL value in a first set of the media trace packets that cause a first intermediate node in the media path to reject the first set of media trace packets and send back a first rejection notice; and
    setting a second larger TTL value in a second set of the media trace packets that allow the first intermediate node to forward the second set of the media trace packets while causing a second intermediate node in the media path to reject the second set of the media trace packets and send back a second rejection notice.

9. A system for analyzing a media path in a packet switched network, comprising:
    means for providing media trace packets configured to use the same application protocol as actual media payload packets to be sent along the media path and further configured to match, at a protocol layer other than that of the application protocol, a priority indicator to be provided by the actual media payload packets to specify a desired one of a plurality of priority levels available in the network, wherein the media trace packets have the same class of service bits and same ports as the actual media payload packets, and wherein the media trace packets have a different synchronization identifier than the actual media payload packets;
    means for varying a Time To Live (TTL) value in the media trace packets to intentionally cause faults at intermediate nodes in the media path; and
    means for analyzing fault notices received from the intermediate nodes in the media path caused by the media trace packets.

10. A system according to claim 9 including means for providing media trace packets configured to use Real Time Protocol (RTP) as the application protocol and further configured to use Differentiated Services Code Point (DSCP) bits as the priority indicator.

11. A system according to claim 9 including:
    means for conducting a media signaling protocol that establishes the media path between a source and destination endpoint;
    means for using a same media header format for the media trace packets and media payload packets; and
    means for setting a first set of TTL values in the media trace packets to a low enough value to cause a fault condition in one of the intermediate modes in the media path such that a portion of each media trace packet causing the fault condition is returned in a corresponding reject notice to the source endpoint.

12. A system according to claim 11 including means for setting a second set of TTL values so that at least some of the media trace packets reach the destination endpoint.

13. A system according to claim 12 including means for setting a member bit in the media trace packets that cause the destination endpoint to immediately generate, using a Real Time Control Protocol (RTCP), a media path analysis report for the media trace packets.

14. A system according to claim 13 including means for determining whether or not to transmit a media stream over the media path according to contents of the media path analysis report.

15. A system according to claim 9 including means for causing the media trace packets to play out low volume noise when received by a destination endpoint by inserting the low volume noise into media payload fields of the media trace packets before sending the media trace packets along the media path.

16. A system according to claim 9 including:
    means for setting a first TTL value in a first set of the media trace packets that cause a first intermediate node in the media path to reject the first set of the media trace packets and send back a first rejection notice; and
    means for setting a second larger TTL value in a second set of the media trace packets that allow the first intermediate node to forward the second set of the media trace packets while
    causing a second intermediate node in the media path to reject the second set of the media trace packets and send back a second rejection notice.

17. A computer readable medium having stored thereon computer executable instructions for analyzing a media path in a packet switched network that, when executed by a processor, causes the processor to perform the method of:
    providing media trace packets configured to use the same application protocol as actual media payload packets to be sent along the media path and further configured to match, at a protocol layer other than that of the application protocol, a priority indicator to be provided by the actual media payload packets to specify a desired one of a plurality of priority levels available in the network, wherein the media trace packets have the same class of service bits and same ports as the actual media payload packets, and wherein the media trace packets have a different synchronization identifier than the actual media payload packets;
    varying a Time To Live (TTL) value in the media trace packets to intentionally cause faults at intermediate nodes in the media path; and
    analyzing fault notices received from the intermediate nodes in the media path caused by the media trace packets.

18. A computer readable medium according to claim 17 including providing media trace packets configured to use Real Time Protocol (RTP) as the application protocol and further configured to use Differentiated Services Code Point (DSCP) bits as the priority indicator.

19. A computer readable medium according to claim 17 including:
- conducting a media signaling protocol that establishes the media path between a source and destination endpoint;
- using a same media header format for the media trace packets and media payload packets; and
- setting a first set of TTL values in the media trace packets to a low enough value to cause a fault condition in one of the intermediate modes in the media path such that a portion of each media trace packet causing the fault condition is returned in a corresponding reject notice to the source endpoint.

20. A computer readable medium according to claim 19 including setting a second set of TTL values so that at least some of the media trace packets reach the destination endpoint.

21. A computer readable medium according to claim 20 including setting a member bit in the media trace packets that cause the destination endpoint to immediately generate, using a Real Time Control Protocol (RTCP), a media path analysis report for the media trace packets.

22. A computer readable medium according to claim 21 including determining whether or not to transmit a media stream over the media path according to contents of the media path analysis report.

23. A computer readable medium according to claim 17 including causing the media trace packets to play out low volume noise when received by a destination endpoint by inserting the low volume noise into media payload fields of the media trace packets before sending the media trace packets along the media path.

24. A computer readable medium according to claim 17 including:
- setting a first TTL value in a first set of the media trace packets that cause a first intermediate node in the media path to reject the first set of the media trace packets and send back a first rejection notice; and
- setting a second larger TTL value in a second set of the media trace packets that allow the first intermediate node to forward the second set of the media trace packets while causing a second intermediate node in the media path to reject the second set of the media trace packets and send back a second rejection notice.

\* \* \* \* \*

UNITED STATES PATENT AND TRADEMARK OFFICE
CERTIFICATE OF CORRECTION

| | |
|---|---|
| PATENT NO. | : 7,496,044 B1 |
| APPLICATION NO. | : 10/797689 |
| DATED | : February 24, 2009 |
| INVENTOR(S) | : Wing |

It is certified that error appears in the above-identified patent and that said Letters Patent is hereby corrected as shown below:

At column 13, line 11, please replace "modes" with --nodes--.
At column 14, line 12, please replace "modes" with --nodes--.
At column 14, line 42, please replace "packets while ¶ causing a" with --packets while causing a--.
At column 15, line 15, please replace "modes" with --nodes--.

Signed and Sealed this

Twenty-eighth Day of April, 2009

JOHN DOLL
*Acting Director of the United States Patent and Trademark Office*